United States Patent [19]

Chazot et al.

[11] Patent Number: 5,228,361
[45] Date of Patent: Jul. 20, 1993

[54] POLARISED GEARCHANGE LEVER, IN PARTICULAR FOR A MOTOR VEHICLE GEARBOX

[75] Inventors: Frank Chazot, Margency; Emannuel Lafaye, Paris; Giovanni Grieco, Bobigny, all of France

[73] Assignee: Valeo, Paris, France

[21] Appl. No.: 840,138

[22] Filed: Feb. 24, 1992

[30] Foreign Application Priority Data

Mar. 1, 1991 [FR] France ................................ 91 02488

[51] Int. Cl.[5] ............................................. G05G 1/04
[52] U.S. Cl. .................................... 74/523; 200/61.88
[58] Field of Search .............. 74/523; 200/6 A, 61–88

[56] References Cited

U.S. PATENT DOCUMENTS

| | | | |
|---|---|---|---|
| 4,144,424 | 3/1979 | Takeda et al. | 200/6 A X |
| 4,183,424 | 1/1980 | Rumyantsev et al. | 200/61.88 X |
| 4,723,642 | 2/1988 | Grunberg et al. | 192/3.55 |
| 5,029,683 | 7/1991 | Grunberg et al. | 192/3.55 |
| 5,033,324 | 7/1991 | Glaser | 200/61.88 X |

FOREIGN PATENT DOCUMENTS

| | | |
|---|---|---|
| 0225211 | 12/1989 | European Pat. Off. |
| 2435794 | 4/1980 | France. |
| 2646815 | 11/1990 | France. |
| 9002895 | 4/1990 | World Int. Prop. O. |

OTHER PUBLICATIONS

Automotive Engineering, "Electronic Actuator Eliminates Clutch Pedal," Oct. 1984.

*Primary Examiner*—Dirk Wright
*Attorney, Agent, or Firm*—Longacre & White

[57] ABSTRACT

A polarised manual gearchange lever for a motor vehicle gearbox or the like comprises an upstream part having a knob and carried by a downstream part of the lever, with a slight misalignment between the two parts occurring on manipulation of the knob, together with a force threshold detector which includes electrical sensor means. The force threshold detector comprises a resiliently deformable, or elastic, bar having a head portion, which is fixed with respect to the knob, and a foot portion which is fixed against deflection in a female element that is itself fixed to the downstream part of the lever.

15 Claims, 7 Drawing Sheets

POLARISED GEARCHANGE LEVER, IN PARTICULAR FOR A MOTOR VEHICLE GEARBOX

FIELD OF THE INVENTION

This invention relates to gearchange levers for manual operation, especially though not necessarily for motor vehicle gearboxes.

More particularly, the invention concerns a polarised gearchange lever for controlling a sped changing apparatus, in particular for motor vehicles, the lever being of the kind comprising an upstream part having a knob adapted to be operated by the driver, a downstream part adapted to be connected to a control linkage for the said speed changing apparatus, with the upstream part being carried by the downstream part in such a way that the upstream part can be moved out of alignment with the downstream part, the gearchange lever further including force threshold detecting means acting between the said upstream and downstream parts for detecting an attempt by the driver to operate the gearchange lever, with the said detecting means including electrical sensor means and resilient return means, whereby firstly to restore the said upstream and downstream parts into alignment with each other when the lever is not being operated by the driver, and secondly to cause electrical signals to be generated from the said sensor, beyond a predetermined force threshold when the lever is operated by the driver in one or other of two opposed reference directions. Such a gearchange lever will be referred to as a lever of the kind specified.

BACKGROUND OF THE INVENTION

An arrangement with a lever of the kind specified is described in the specifications of U.S. Pat. No. 4,723,642 and the corresponding French published patent application No. FR 2 575 707A. That document discloses an upstream lever part which has a projecting contact element associated with electrical contact zones of the sensors, so that this contact element makes electrical contacts. It also discloses arrangements which use a coil spring and articulating devices. These arrangements involve clearances such that the force threshold may vary over a period of time. In addition, manufacturing tolerances have to be taken into account.

To overcome this drawback, it is possible to use blocks of suitable resilient material to take the place of the coil springs. However, that arrangement is also unsatisfactory because the characteristics of the resilient material change over a period of time. In addition, the resilient blocks are liable to dispersion effects during manufacture.

DISCUSSION OF THE INVENTION

An object of the present invention is to overcome the above drawbacks by providing a simple and economical lever with force threshold detecting means such as to stabilise the force threshold, not only over a period of use but also during manufacture.

According to the invention, a lever of the kind specified is characterised in that the force threshold detecting means comprise a resiliently deformable elastic bar having a head portion which is fixed to the knob, and a foot portion which is fixed against deflection in a female element that is itself fixed with respect to the said downstream part.

The lever according to the invention provides a flexible beam, (the elastic bar), which has one of its head or foot portions built-in, i.e. fixed against deflection, to one of the two parts of the lever, while the other of its said portions is carried by the other part of the lever. When the two parts of the lever move slightly out of alignment, the elasticity of the bar tends to return them into alignment. The stiffness of the elastic bar is stable both over a period of use and in manufacture. The elastic bar is deformable by bending, and causes an electrical signal to be generated in response to a given applied force. In addition, due to its built-in relationship with the female element, the clearances are reduced, as is the number of components. The overall size of the lever is also reduced because the elastic bar can be made quite slender.

It will be appreciated that the projecting contact element, which is preferably in the form of a contact ring, may be carried by a component which is fixed to either the upstream or downstream part of the lever, or it may be carried by the elastic bar. The contact ring element may have the same cross section as the foot portion by which the elastic bar is anchored.

According to a preferred feature of the invention, the projecting contact element is arranged in the vicinity of the head portion of the elastic bar. This enables the size of the gearchange lever to be reduced, and the elastic bar can be fitted in place of existing components with minimum change to other components of the lever. In addition, the steps necessary to establish the electrical contacts are reduced, as is the response time. Besides the foregoing, when the lever has a lock release element with a gripping element, e.g. for releasing the lever to engage reverse gear, the projecting contact element can be arranged at the level of the above mentioned gripping element, taking advantage of the space made available at this location.

According to another preferred feature of the invention, electrical contact zones of the sensor means are carried by a hollow support member which partly surrounds the elastic bar with only a slight clearance, the hollow support member being fixed with respect to either the upstream or the downstream part of the lever. This hollow support member may take any suitable form, e.g. it may be tubular or formed with a blind central bore: without prejudice to the generality of that statement, the hollow support member is referred to in this description and in the Claims as a "ferrule". Where a ferrule is provided, it preferably also defines the above mentioned female element.

With this arrangement, manufacture of the lever is simplified and the clearance between the elastic bar and the ferrule is satisfactorily stabilised, which enables the electrical contacts to be set up with precision for any precisely selected force threshold.

The ferrule constitutes a kind of extension of the upstream or downstream part of the lever to which it is fixed, and also constitutes a reaction member against applied forces, so as to limit the angular displacement of the upstream part of the lever with respect to its downstream part when the lever is operated by the driver.

Advantage may be taken of the presence of this ferrule to attach adhesively to it a flexible electrical circuit on which the said contact zones are applied. The ferrule is adapted for mating engagement of the foot portion or the head portion of the elastic bar within it, in such a way that a sub-assembly can be made up consisting of the elastic bar and the ferrule.

The description of preferred embodiments of the invention which follows illustrates the invention by way of example only, and with reference to the accompanying drawings.

DESCRIPTION OF PREFERRED EMBODIMENTS OF THE INVENTION

In the various embodiments described below, the polarised gearchange lever, generally suitable for controlling a speed changing apparatus, consists of a lever 1, of the kind sometimes referred to as a broken lever, for controlling a gearbox of a motor vehicle giving selection of discrete gear ratios. As described in the specification of U.S. Pat. No. 4,723,642 and the corresponding French published patent application No. FR 2 575 707A, this lever comprises an upper, or upstream, manoeuvring part having a knob 4 for operation by the driver, and a downstream, or lower, control part which is arranged to be coupled to a control linkage 19 for the gearbox. The linkage 19 is only partially shown, but reference is invited to European patent specification No. 0 383 688 and the specification of the corresponding U.S. Pat. No. 5,029,683 for more detail as to this linkage.

The upstream, or manoeuvring, part of the lever 1 is carried by the downstream, or control, part of the lever, which is adapted so that the upstream part is able to be deflected at a slight angle with respect to the downstream part, so that the two parts can move slightly out of alignment with each other.

Detecting means for detecting a force threshold and intended to detect an attempt by the driver to manoeuvre the gearchange lever, are also provided. These detection means comprise at least one electrical sensor and resilient return means. The purpose of the resilient return means is to put the upstream and downstream parts of the lever back into alignment with each other when, in the neutral position, the lever 1 is not so operated by the driver as to interrupt the electrical contacts. The resilient return means are also such as to cause electrical signals to be generated through the said sensor beyond a predetermined force threshold, when the lever is operated by the driver in one or other of two opposed reference directions which are indicated by the unreferenced arrows in FIGS. 2, 3 and 19.

Figure 1:
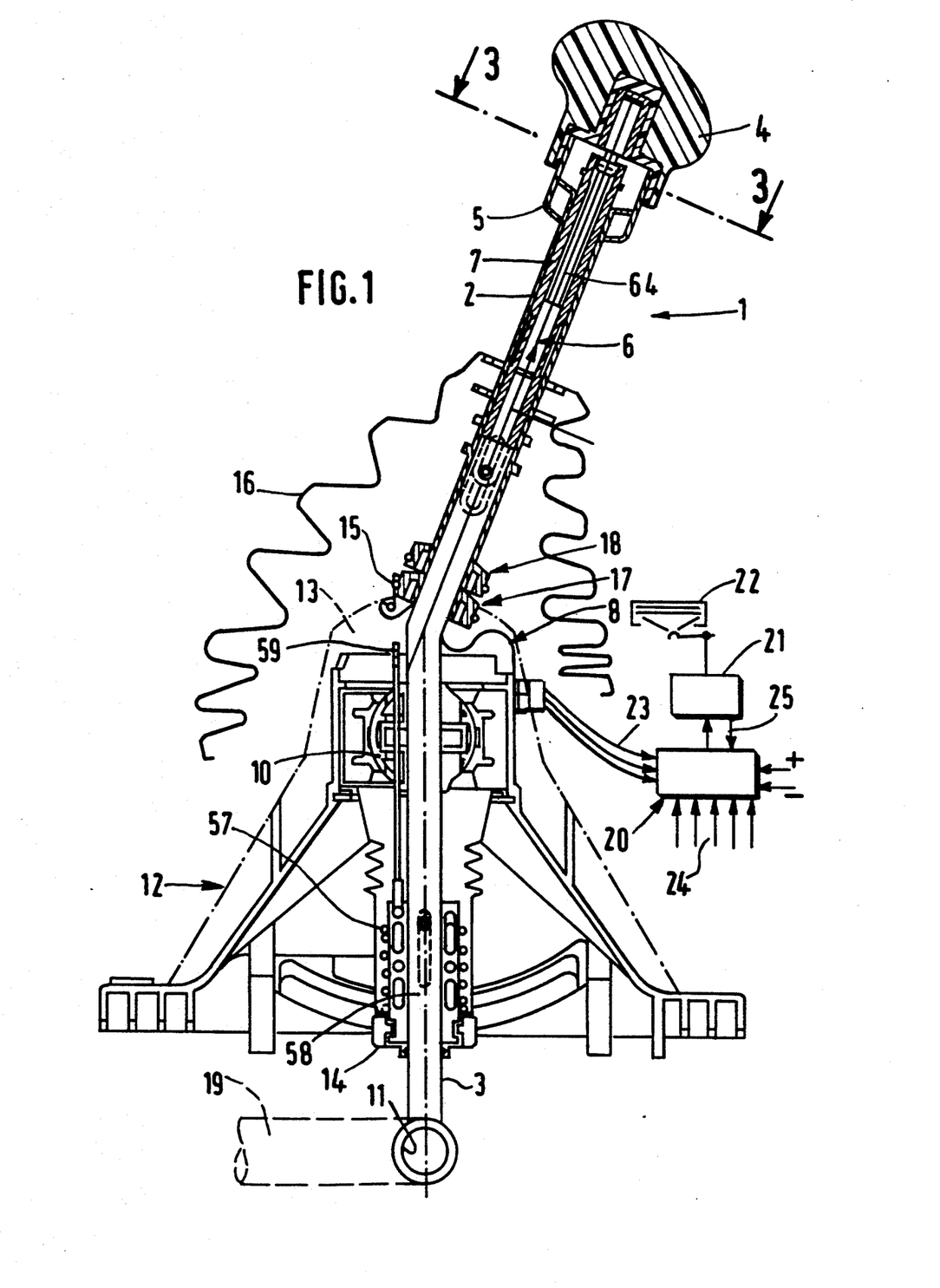
FIG. 1 is a view in axial cross section of a lever in accordance with the invention, with an associated actuator/clutch computer being shown diagrammatically.
Figures 11, 12, 13, 14, 23:
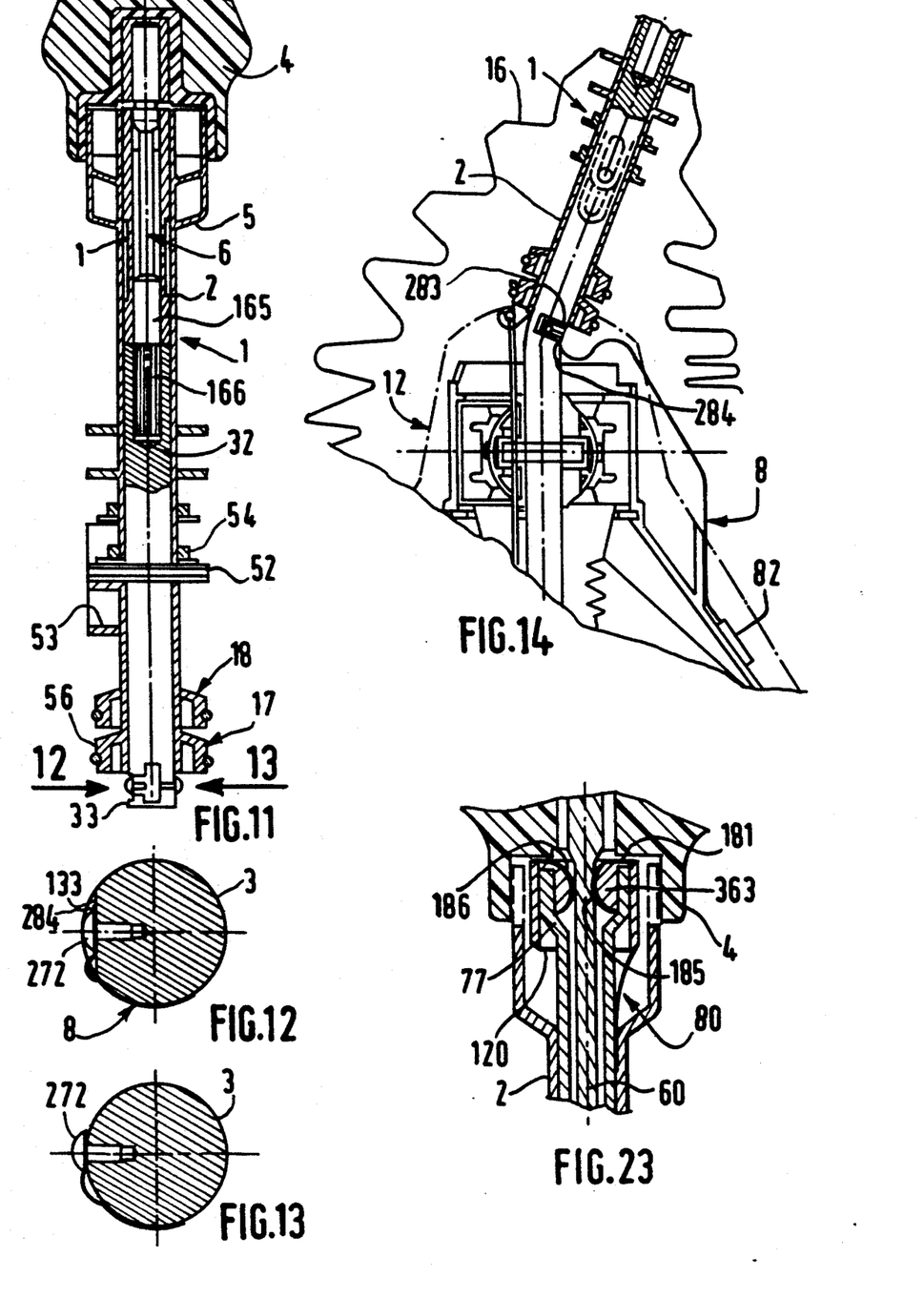
FIG. 11 a partial view similar to FIG. 1, but showing a third embodiment of the invention.
FIGS. 12 and 13 are views in cross section taken respectively in the directions of the arrows 12 and 13 in FIG. 11.
FIG. 14 is a partial view showing the lower part of the lever seen in FIG. 11.
FIG. 23 is a view similar to FIG. 20, but showing a ninth embodiment of the invention.
Figures 15, 16, 17, 18:
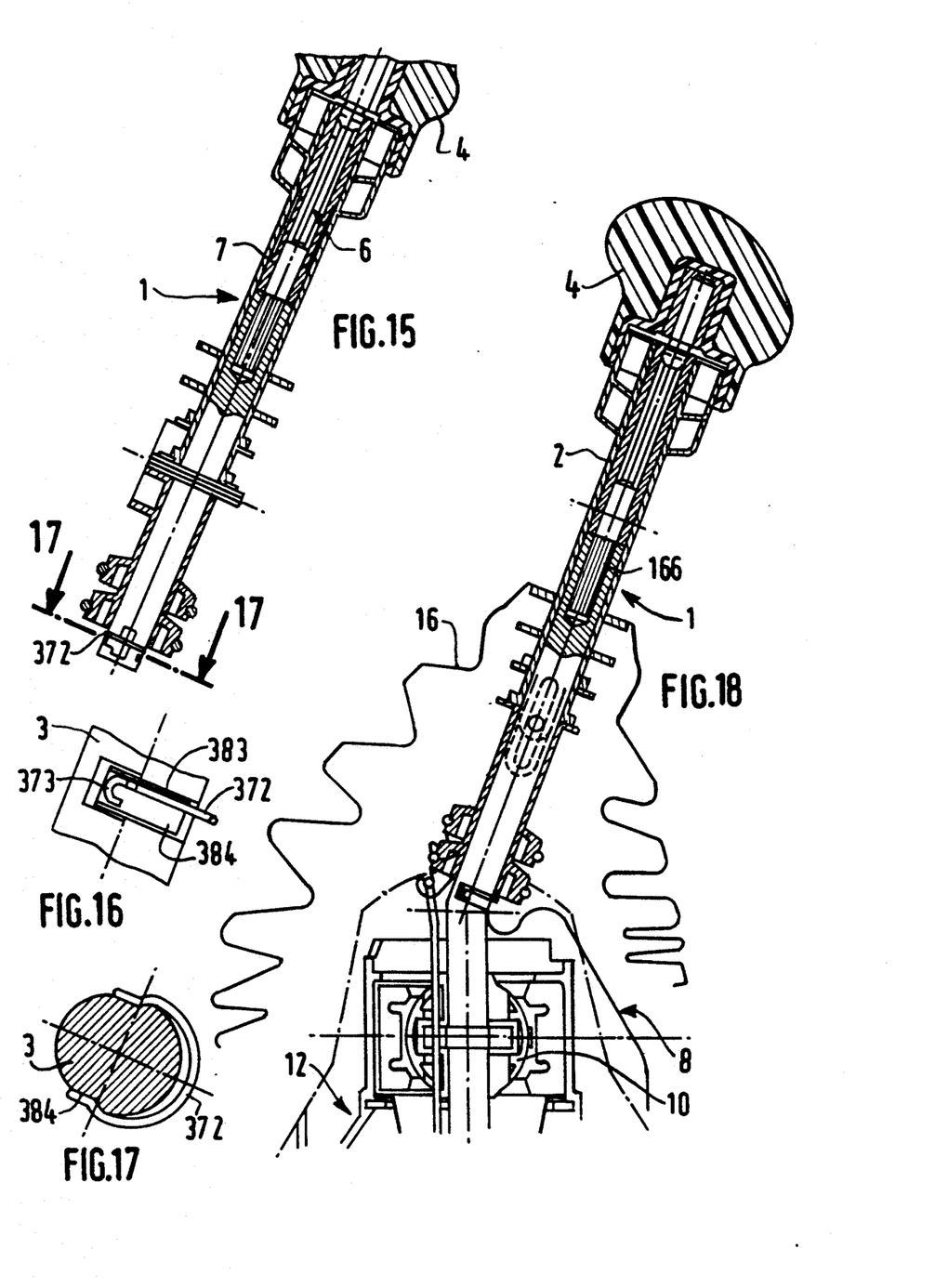
FIG. 15 is a view similar to FIG. 11 but showing a fourth embodiment of the invention.
FIG. 16 repeats, on a larger scale, the detail of FIG. 18 which relates to the earth connection of the flexible supply circuit.
FIG. 17 is a view in cross section taken on the line 17—17 in FIG. 15.
FIG. 18 is a partial view similar to FIG. 1, but with the lever in the fourth embodiment of FIG. 15.

In a first embodiment of the invention, the detecting means include electrical contact zones of the sensors, which are such as to complete electrical circuits through these contact zones beyond the predetermined force threshold. The detecting means also includes a projecting contact element, which in this example is in the form of a radially enlarged ring 63. The downstream part of the lever 1 comprises a bar or stem 3, which may be cranked as in FIG. 1, together with a lock release member 2 which, over a major part of its length surrounds the upstream part of the lever and includes a gripping element 5. The downstream part of the lever is articulated at 10, by means of the stem bar 3, in a support casing 12 which is adapted to be secured to a fixed part of the vehicle. The downstream part is also connected to the control linkage 19 by means of its foot 11. The control linkage 19 controls the means for selecting and engaging the various speed ratios in the gearbox arranged downstream of the gear lever, in a known manner. The articulated joint 10 consists of a spherical bearing cooperating with the fixed support casing 12, and attached to the bar 3 by means of a pivot pin passing through the latter, as can be seen in FIGS. 1, 14 and 18.

The force threshold detecting means are adapted to supply signals to an electronic processing and control circuit 20, which in this example is in the form of a computer such as a microprocessor supplied electrically, for the purpose of electronically controlling an actuator 21. The actuator 21 is adapted to control the disengagement or re-engagement of a clutch 22 in such a way as to enable automatically any changes in gear ratio, and also starting of the vehicle, to take place.

In this particular example, the computer 20 receives, at inputs 24, electrical signals giving information relating in particular to the rotational velocity of the engine, the rotational velocity of the input shaft of the gearbox, the position of the accelerator pedal, the position of the carburettor butterfly valve, and the current gear ratio engaged in the gearbox. These signals are supplied by appropriate sensors, not shown. The computer 20 also has further inputs 23, which receive from the lever 1 further electrical signals giving information relating to the intention of the driver to change gear. The computer transmits information signals via an output 25 to the actuator 21, which may consist of an electric motor in the manner described in the journal "Automotive Engineering" for October 1984. Alternatively the actuator 21 may be a hydraulic jack-type actuator, with feedback relating to the state of displacement of the actuator. The computer 20 is connected to the terminals of the battery, not shown, of the vehicle.

The lock release member 2 is guided in straight line translational movement by the stem 3, and the casing 12 carries first and second security means. These security means are described in the specification of European published patent application No. EP 0 225 211A and that of the corresponding French published patent application No. FR 2 589 597A, and are provided for the purpose of preventing any accidental engagement of reverse gear. The first of these security means comprises a guide path element 13 fixed to the casing 12 and preferably made of a plastics material, and a ring 15, of noise-suppressing rubber, carried by the widened base portion 56 of the lock release member 2. The second security means are indicated at 14 and include a cable 59 (see FIGS. 1, 14 and 18), which is engaged in hooked relationship to the base portion 56, together with an intermediate member 58 carrying a spring 57.

The lock release member 2 is mounted for axial movement with respect to the stem 3 against the action of the spring 57, between a lower position 17 in which the ring 15 cooperates with the guide path element 13, and an upper position 18 in which the lock release member escapes from the guide path element 13 for engaging reverse gear. The lock release member 2 is formed with two oblong, diametrically opposed, slots 53 which can be seen in FIGS. 2, 14 and 18. These slots 53 cooperate with a pin 52 which is fixed to the stem 3 and which passes through it. The intermediate member 58 also has two oblong slots for cooperating with another pin fixed to the stem 3, as is shown in FIG. 1.

Figures 2, 3:
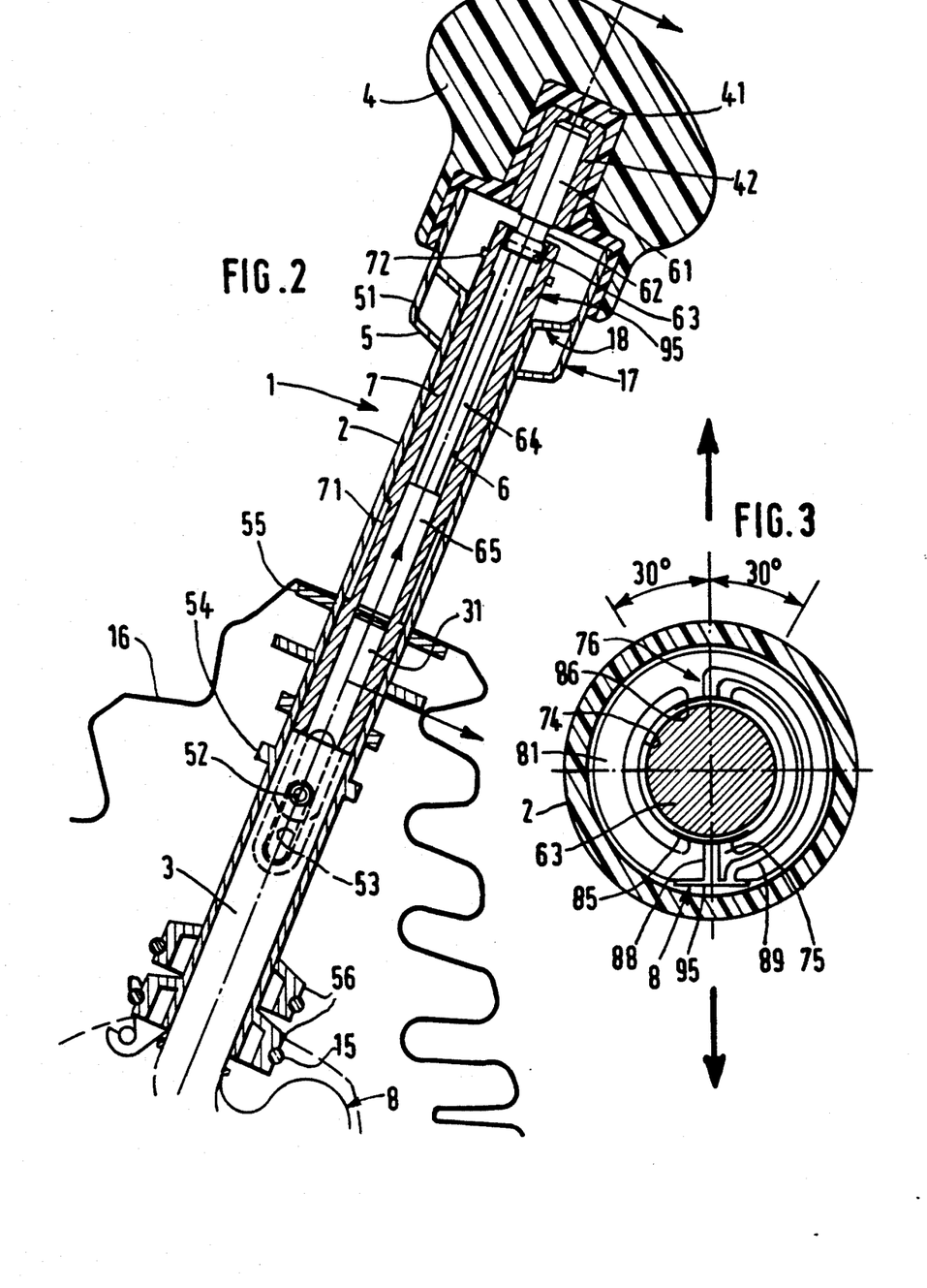
FIG. 2 is a view similar to FIG. 1, showing on a larger scale an upper part of the same.
FIG. 3 is a view in cross section taken on the line 3—3 in FIG. 1 and FIG. 7.

The force threshold detecting means include a resiliently deformable metal bar 6, referred to herein as an elastic bar and having a head portion 61, which is attached to the knob 4, and a foot portion 65, FIG. 1, which is fixed against deflection within, i.e. built into, a female mating portion 7, FIG. 1, or 32 in FIG. 11, which in general terms is fixed with respect to the downstream part 2, 3 of the gear lever 1. It should be noted that the foot portion 65 of FIG. 2 is referred to by the reference numerals 165–166 in FIG. 11, and 265 in FIG. 22.

Figures 4, 5, 6, 22:
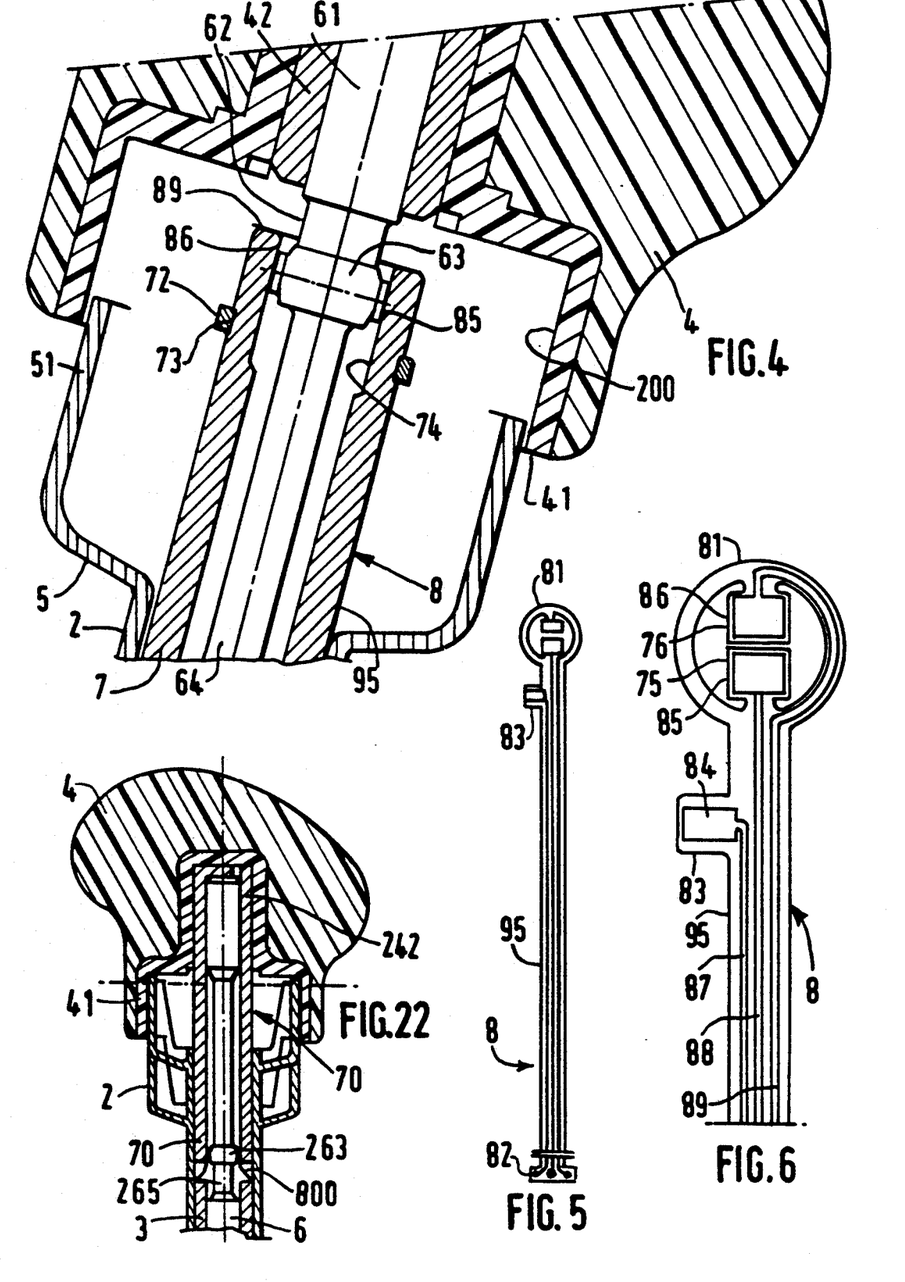
FIG. 4 shows an upper part of the lever shown in FIG. 1, on an even larger scale.
FIG. 5 is a diagrammatic view showing a flexible electrical supply circuit associated with the stem of the downstream part of the lever.
FIG. 6 is a view of the upper part of FIG. 5, but on a larger scale.
FIG. 22 is a partial view similar to FIG. 19, but showing an eighth embodiment of the invention.
Figure 7:
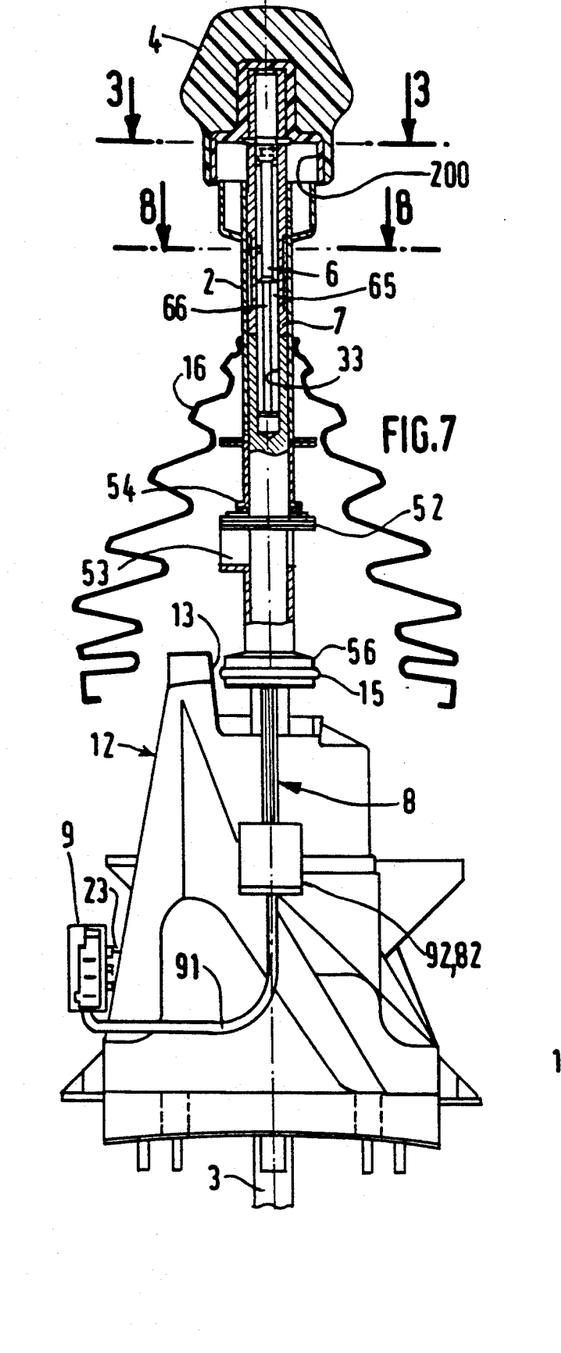
FIG. 7 is a view in axial cross section similar to FIG. 1, showing a second embodiment of the invention.

In all the embodiments described herein with reference to FIGS. 1 to 22, there are two sensors with electrical contact zones, these sensors being fixed to the downstream part of the lever in FIGS. 1 to 21, or to the upstream part in FIG. 22. These sensors are associated with the contact ring 63, FIG. 2, or with similar rings 163, 263 in other Figures, all of which are fitted to, or formed on, the elastic bar 6. The contact ring lies between the head portion 61 and foot portion 65 of the elastic bar 6, and is arranged to establish electrical contact with the electrical contact zones of the sensors. Thus the contact ring may be carried by either the downstream or upstream part of the gear change lever. In the embodiments shown in FIGS. 1 to 21, the contact ring 63 or 163 is fixed to the upstream part of the gear lever and is arranged close to the head portion 61 of the elastic bar 6, to which it is joined through an intermediate portion 62 of the bar 6. The intermediate portion 62 has a reduced cross section by comparison with the cross sections of the head portion 61 and contact ring 63 or 163.

By contrast, in FIG. 22 the contact ring, 263, is arranged close to the foot portion, 265, of the bar 6 and is fixed to the downstream part of the gear lever. In all cases the projecting contact ring can be carried by either the elastic bar or a ferrule which will be described below.

Figures 19, 20, 21:
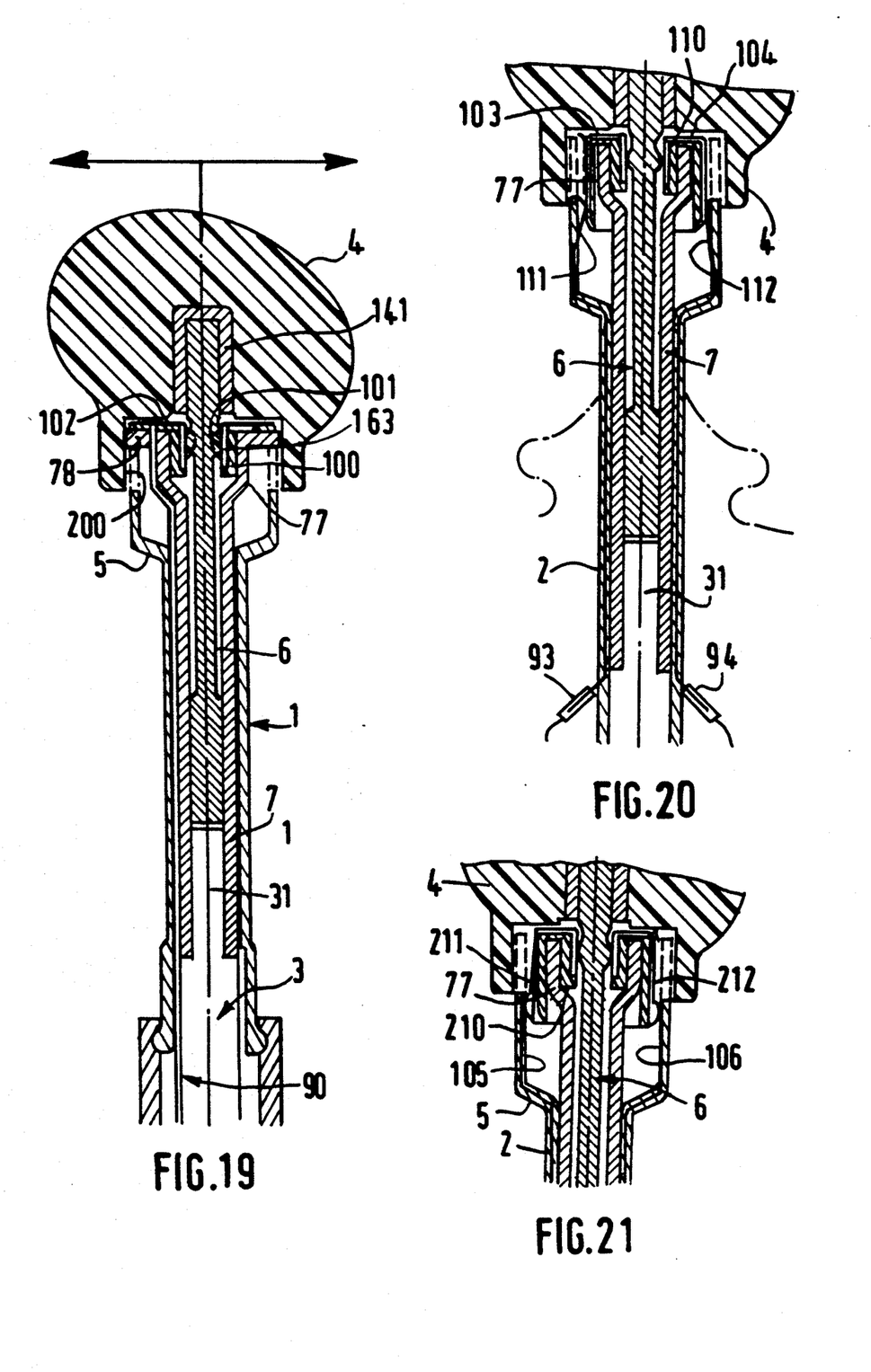
FIG. 19 is a partial view similar to FIG. 2, but showing a fifth embodiment of the invention.
FIGS. 20 and 21 are partial views similar to FIG. 19, but showing a sixth embodiment and a seventh embodiment of the invention, respectively.

In FIGS. 1 to 18 the contact ring has a curved side or circumferential surface delimited between two flat faces, its shape being generally that of a flat ended barrel. By contrast, the contact ring 163 in FIGS. 19 to 21 is in the form of part of a sphere. However, in all cases the contact ring 63, 163 or 263 is arranged to make local contact with the contact zones described below.

The head portion 61 of the elastic bar 6 is fixed with respect to the knob 4 through an insert member. In FIGS. 1 to 18, the head portion 61 is mounted in an insert 42 to which it is fixed, for example by means of an adhesive. The insert 42 is secured inside a further insert which is carried by the knob 4. This arrangement is adopted because the knob 4 is a standard knob having, as is usual, the insert 41. However, in FIGS. 19 to 21 it will be noted that the head portion 61 is mounted within a single insert 141, while in FIG. 22 the knob 4, while having the insert 41, also has an insert 70 in the form of a ferrule to be described below. In all the Figures, the knob 4 is hollow, having a blind recess in its bottom.

The projecting contact ring 63 or 163 of FIGS. 1 to 21 is arranged within the hollow recess 200 of the knob 4, in the substantial free space defined within the latter.

The lock release member 2 has a widened head portion 51 which is joined to the shank portion of the member 2 through the gripping portion 5, which as can be seen in the drawings is inclined. As can be seen in FIG. 2, the head portion 51 is arranged to penetrate into the hollow recess 200 when the driver pulls upwards on the lock release member 2 prior to engaging reverse gear. As will already have been appreciated, the lock release member 2 is in the form of a hollow tube having a circular cross section. Its head portion 51 is similarly shaped. The release member 2 also has a stop element 54 arranged intermediately between its head portion 51 and base portion 56. The stop element 54 cooperates with the pin 52 under the action of the spring 57 when reverse gear is not engaged. In this example the pin 52 consists of a cotter pin passing through the stem 3. Above the stop element 54, the lock release member 2 also has a shoulder 55 formed on an external collar for supporting a protective sock 16 which is attached to the fixed support casing 12.

In FIGS. 1 to 21, the projecting contact ring 63 or 163 is joined to the foot portion 65 or 165–166 of the elastic bar 6, through a middle or connecting portion 64 of the bar, having a reduced cross section as compared with those of the foot portion 65 or 165–166 and the head portion 61. In this example, the elastic bar 6 is of metal and is also cylindrical. The diameter of the head portion 61 is equal to that of the foot portion 65 (FIGS. 1 to 10) or the foot portion 165–166 in FIGS. 11 to 18.

In this example, the diameter of the foot portions 65 and 165 lies between one and a half times and twice the diameter of the middle portion 64. This does of course depend on the particular application, as does the actual length of the middle portion 64. The diameter of the other connecting portion mentioned above, i.e. the portion 62 of reduced cross section, is approximately the same as that of the head portion 61, so that the upper part of the bar 6, comprising the various portions 61, 62, 63, is rigid by comparison with the middle portion 64. The cross section of the intermediate portion 62 is thus greater than that of the middle portion 64, and the length of the intermediate portion 62 is much smaller than that of the middle portion 64. The maximum diameter of the projecting contact ring 63 or 163 is equal to that of the foot portion 65 or 165.

The electrical contact zones mentioned above are carried by a hollow support member or ferrule 7 or 170, which is fixed either to the downstream part of the gear lever as in FIGS. 1 to 21, or to the upstream part as in FIG. 22. Here this ferrule 7 or 70 is tubular and is surrounded, with a clearance, by the lock release member 2. It is preferably of a material which is electrically conducting like the bars 3 and 6. In this example it is of metal.

In FIGS. 1 to 6, the ferrule 7 is secured on a projecting nose portion 31 of the stem 3, formed on the head of the latter radially outside the pin 52, i.e. so that the pin 52 lies between the nose portion 31 and the articulated joint 10, see FIGS. 1 and 2. The metal ferrule 7 is fitted, being for example force fitted, on to the nose portion 31. The diameter of the latter is smaller than that of the main part of the stem 3, which is, incidentally, cylindrical. As will have been realised, the ferrule 7 also defines the female mating element for the elastic bar 6, being fixed with respect to the downstream part of the gearchange lever 1. The elastic bar 6 is fitted within the ferrule 7, into which its foot portion 65 is secured, for example by means of an adhesive. The diameter of the foot portion 65 is equal to that of the nose portion 31, these two elements being axially aligned with each other due to the centring action of the ferrule 7.

The ferrule 7 has two external, diametrically opposed flats 71 (see also FIG. 8) which are level with the foot portion 65 of the elastic bar 6. These flats enable the ferrule 7 to be engaged by the gripping jaws of a suitable tool for manipulation of the ferrule so that a sub-assembly comprising the elastic bar 6 and ferrule 7 can be made by inserting the bar 6 into the ferrule 7 in either direction.

In FIGS. 7 to 10, the stem 3 has a blind hole 33 in its head, and the foot portion 65 of the elastic bar 6 is extended so as to penetrate into this blind hole 33. The elastic bar 6 is thus held directly in the downstream part of the gearchange lever, with the ferrule 7 being fixed to the stem 3 through the foot portion 65. Here again, a sub-assembly is formed consisting of the ferrule 7 and elastic bar 6, with the foot portion 65 of the latter being force fitted into the ferrule 7 in a manner described below.

In FIGS. 11 to 18, the foot portion of the elastic bar 6 consists of two sections 165 and 166. The upper section 165 is smooth and is arranged to be force fitted into the ferrule 7, while the lower section 166 is roughened, its diameter being slightly greater than that of the upper section 165. This lower section 166 is fitted into a blind hole 32, FIG. 11, formed in the head of the stem 3 of the downstream part of the gearchange lever. Here again the elastic bar 6 is directly received in the downstream part, forming a sub-assembly consisting of the ferrule 7 and the bar 6 so that the ferrule 7 is actually secured to the stem through the foot portion of the elastic bar 6.

It will be noted that with the bars 6 and 3 being made in electrically conductive material, and being in this example of metal, this mating fitting with a roughened surface ensures electrical continuity, so that the electrical earth connection can be effected below the lock release member 2 and foot portion 65. By contrast, in the embodiment shown in FIG. 1, where securing is by adhesion, the earth return must be obtained above the foot portion 65.

In FIGS. 1 to 21, the ferrule 7 is axially aligned with the cranked bar 3, and to some extent reinforces the latter, with the head of the ferrule 7 being adapted to penetrate into the hollow recess 200 of the knob 4, so that the contact zones are arranged at the level of this head. In FIGS. 1 to 21 again, the ferrule 7 has an internal bore 74 of increased diameter at the level of its head for cooperation with the contact ring 63 or 163. A predetermined clearance exists between this bore 74 and the contact ring 63 of the bar (see FIGS. 2 and 3).

The contact zones preferably form part of a flexible electrical supply circuit 8, FIGS. 5 and 6. This circuit is thin enough to enable it to follow the shape of the ferrule 7. The circuit is mounted between the ferrule 7 and the lock release member 2, and comprises an electrically insulating support 95 having a lower surface which is pre-applied by coating over a length extending from the head of the ferrule 7 to the base of the lock release member 2, as can be seen in FIG. 1, when the release member 2 is in the lower position 17. The upper face of the support 95 carries electrically conductive strips 87, 88 and 89, which in this example are copper strips constituting electrical connecting lines, which are protected by a suitable electrically insulating varnish coating. See in particular FIGS. 3 and 10. The line 87 is for earth connection, while the lines 88 and 89 are arranged to be connected to the inputs of the computer 20. The lower face of the support 95 is initially coated with a peelable protective skin. Before the circuit 8 is fitted, this protective skin is peeled off so as to adhere the support 95 on to both the ferrule 7 and the stem 3. This is made possible by virtue of the clearance that exists between the lock release member 2 and the ferrule 7 carried by the stem 3, together with the small thickness of the circuit 8.

Figure 9:
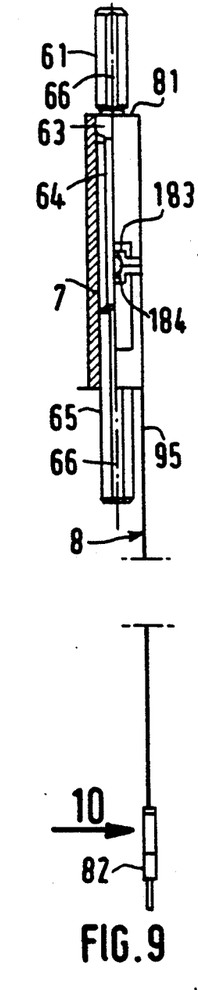
FIG. 9 is a view in partial cross section of an assembly in accordance with the invention comprising an elastic rod, a ferrule, and a flexible electrical supply circuit.
Figure 10:
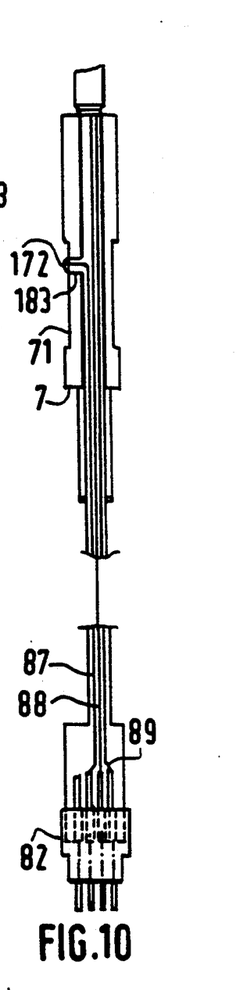
FIG. 10 is a view seen in the direction of the arrow 10 in FIG. 9.

At its base the circuit 8 has a connector 82, see FIGS. 9 and 10. This connector 82 constitutes a female element for cooperation, as in FIG. 7, with a male connector 92 which is connected through wires 91 to a further connector 9. The connector 9 is connected to wires which lead at 23 to the computer 20. An assembly 9, 91, 92 is thus made, which constitutes an adaptor for connecting the flexible circuit 8 to the wire conductors 23 leading to the computer 20.

Referring now in particular to FIG. 6, the copper strip 87 is connected to a tongue 84 defining a contact zone which is of copper and nickel. This zone is not coated with the insulating protective varnish, and is therefore exposed. Similarly, the strips 88 and 89 terminate in tongues 85 and 86 respectively, again of copper and nickel and not varnished. They are therefore exposed. The tongue 84 is supported by a projecting lug portion of the support 95, while the tongues 85 and 86 are supported by diametrically opposed lug portions 75 and 76 respectively which project towards each other from a surrounding ring portion, or substrate ring, 81 of the support 95. The strip 88 is joined to the tongue 85 directly in the region of the junction zone between the ring portion 81 and the straight part of the support 95. The strip 89 extends along the ring portion 81, which is generally circular, to be joined to the tongue 86 as seen in FIG. 6.

The lug portions 75 and 76 and their associated tongues 85 and 86 respectively project inside the ring portion 81, with each tab portion having a root zone of reduced width to facilitate folding. As will be evident, the lug portions 75, 76 and 83 and the ring portion 81 are pre-coated with adhesive, but the straight part of the support 95 need only be coated with adhesive over part of its length. The circuit 8 is fitted by applying the lug portion 83 and the straight part of the support 95 adhesively on the ferrule 7, with the circuit 8, and particularly the lug portion 83, being retained by means of a circlip 72 (see FIG. 2), which is engaged in a groove 73 formed on the head of the ferrule 7. The circlip 72 is therefore in contact with the tongue 84, and ensures good earth contact for the ferrule 7.

The gearchange lever 1 is thus electrically earthed, and the driver runs no danger of receiving any electric shocks when manoeuvring the lever. The ring portion 81 is also folded, being secured adhesively at the end of the head of the ferrule 7, and preferably on rounded external and internal surfaces of the latter, while the contact tongues 85 and 86, with their associated lug portions 75 and 76, are bent over into the interior of the ferrule 7, with the lug portions then being adhesively secured to the internal surface of the latter.

As can be best seen in FIG. 4, the size of the ring portion 81 depends on that of the free end of the ferrule 7, the width of the band of material of the ring portion 81 being in this example equal to the wall thickness of the ferrule 7 at its free end on which the ring portion is applied.

When the lever 1 is moved in the direction of the arrows in FIGS. 2 and 3, that is to say when the driver pushes the lever away from him or pulls it towards him, the electrically conductive contact ring 63 is, after the clearance has been taken up, brought into contact with the conductive tongues 85 and 86 through the upper part of the convex surface of the contact ring 63. This makes electric contacts which are interrupted when the driver is not applying pressure to the lever.

According to the direction of displacement of the upstream part of the lever 1, electrical circuits are completed and signals therefore transmitted to the computer 20 so as to activate the actuator 21. The elastic bar 6 therefore constitutes a kind of interruptor. When a gear is selected, for example during a change from second gear to third gear, the lever is pushed and then moved sideways. In all cases, contact is possible between the conductive contact ring 63 and the contact zones 85 and 86. These contact zones are profiled as appropriate for the particular applications. A displacement of about 30° from the neutral line is possible (see FIG. 3). It will also be appreciated that the increased diameter 74 (FIG. 4) of the upper part of the bore of the ferrule 7, in which the contact ring 63 lies, provides enough space for accommodating the lug portions 75 and 76. This diameter is selected for this purpose.

Figure 8:
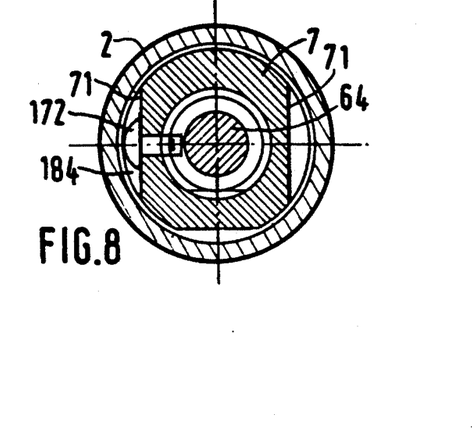
FIG. 8 is a view in cross section taken on the line 8—8 in FIG. 7.

In the modification seen in FIGS. 8 to 10, the flats 71 on the ferrule 7 are used for securing the lug portion, 183, of the earthing tongue, 184, which is connected to the copper strip 87. To this end, the lug portion 183 and the tongue 184 are both formed with holes through which a rivet 172 passes. The head of this rivet lies in the space made available by the presence of the flat 71, and is in contact with the tongue 184 as can be seen in FIG. 8. Accordingly, the lug portion 183 carrying the contact zone 184 is bent over and adhesively secured on to the flat 71, after which the whole is firmly secured by the rivet 172 passing through the ferrule 7 for electrically earthing the latter. In this embodiment the head portion 61 and the foot portion 65 of the elastic bar 6 are each formed with a degassing groove 66.

The sub-assembly consisting of the elastic bar 6, ferrule 7 and electrical circuit 8 is made in the following way:

(a) The circuit 8 is adhesively secured on the ferrule 7 by bending the tongues 85, 86 and 184 down, together with their associated lug portions, and the rivet 172 is fitted;

(b) In a second step, the elastic bar 6 is steeped in liquid nitrogen;

(c) The components are then fitted into each other, with the head portion 61 being inserted through the base of the ferrule 7 until the latter exceeds the required length.

It will be noted that this avoids damage to the flexible circuit 8, since the passages 66 enable gas to be released. In this way the head is force fitted into the ferrule 7, to which it is now secured by means of its foot portion 65. Subsequently, the projecting part of the foot portion 65 is secured in the hole 33 seen in FIG. 7. It will be noted that FIG. 10 shows a fourth conductive strip, which is a supplementary strip for purposes of discharging the connector 82. In FIGS. 11 to 18, due to the mating engagement of the elastic bar 6 in the lock release member 2 by means of the knurled or roughened surface 166, the earthing tongue is secured radially inside the release member 2.

Thus in the arrangement shown in FIGS. 11 to 14, fastening is achieved with the aid of two rivets 272, by which the main part of the circuit 8 and the earthing tongue 284, with its lug portion 283, are respectively secured to the stem 3. It will be noted from FIG. 12 that a small flat is formed on the stem 3 to accommodate the head of this last mentioned rivet 272.

In FIGS. 15 to 18, fastening is obtained by means of a clip 372 which is in the form of a half ring pinched into contact with the earthing tongue, 384, so as to hold the latter against the outer surface of the stem 3. As shown in FIGS. 16 and 17, the latter is profiled appropriately for this purpose, and the clip 372 has two terminal hook portions 373, one of which forces the contact zone 384, carried by its lug portion 383, into contact with the stem 3.

It will be appreciated that in every case, the elastic bar 6 flexes when the knob 4 is moved, with the ferrule 7 constituting a reaction member limiting the displacement of the bar 6. The bar 6 is so constructed that the force required to displace it is precisely predetermined.

The present invention is of course not limited to the embodiments described above. In particular, the head of the ferrule may have a widened portion 77 (FIGS. 19 to 21 and FIG. 23), on which a ring 100 is applied by moulding. The contact zones, 102 and 103, are carried by this ring 100. In this case, these zones are joined to conductive wires passing inside grooves which are provided in the lock release member. It will be noted that these wires, 90, pass through a terminal collar 78 formed on the head portion 77 of the ferrule 7.

The contacts can of course be in the form of friction elements. Thus in FIG. 20, these friction elements 111 and 102 are carried by the lock release member, being connected to wires 93 and 94 mounted inside the lock release member, the end portion 77 of the ferrule carrying the zones of contact 103 and 104. These arrangements may of course be reversed so that the moulded ring 210 (FIG. 21), carries friction contacts 211 and 212 for frictional contact with contact zones 105 and 106 carried by the lock release member. The moulded ring 212 can then constitute the contact ring corresponding with the contact ring 63 in FIG. 2. In that event the latter is absent as indicated by the broken lines in FIG. 19.

Referring to FIG. 23, advantage may be taken from the presence of the flexible electrical circuit 80, which is similar to that shown in FIGS. 5 and 6, to secure the flexible circuit adhesively on to the projecting contact element, here a contact ring, 363, which is here carried by the ring 120, the latter being moulded on to the free end of the ferrule. The contact tongues, seen at 186 and 185, are adhesively secured on to the contact ring 363, and the substrate ring portion of the circuit (corresponding to the ring portion 81 in FIG. 6) is indicated in FIG. 23 at 181. The elastic bar 60 is here smooth.

The contact ring 63 or 163 may be arranged in the region of the foot portion of the elastic bar 6. In that case it is necessary to provide, for example, a collar at the free end of the ferrule 7 for limiting displacements of the elastic bar 6 when the ferrule is fixed to the downstream part of the gearchange lever.

Referring to FIG. 22, the ferrule, here indicated by the reference numeral 70, may be fixed to the upstream part of the gearchange lever. In this case, the ferrule 70 also includes an insert 242 engaged in the insert 41 of the knob 4. The contact ring 263 is then arranged at the foot portion 265 of the elastic bar 6. There is then a clearance between the free end of the ferrule 70 and the upper section of the downstream part of the gear change lever, for receiving the foot portion of the elastic bar 6. It is possible in this case to fit a flexible electrical circuit 800, similar to the circuit 8 of FIGS. 5 and 6, but without the substrate ring portion 81.

Here again, as described above with reference to FIG. 23, it is also possible to reverse the structure by providing a radially enlarged ring moulded on to the free end of the ferrule 70, firstly to define the contact ring (with the elastic bar then being smooth), and secondly to support the contact zones of the flexible circuit.

Although in the various examples described above the ferrule is tubular, the ferrule, and the foot and/or head portions of the elastic bar may be cylindrical in shape but having a rectangular or square cross section, while the same is true for the middle portion of the elastic bar.

The head and foot portions of the elastic bar may be frusto-conical in shape, with the foot portion having a cylindrical part complementary to that of the ferrule extended by the said frusto-conical portion.

Finally, instead of sensors with electrical contacts, an electrical Hall-effect sensor may be provided, so that the provision of a contact ring portion thus becomes unnecessary.

What is claimed is:

1. A polarised gearchange lever for a motor vehicle gearbox, comprising a downstream part having means for connection of the lever to a gearbox control linkage, and an upstream part including a manipulating knob and carried by the downstream part whereby the upstream part can be moved with respect to the downstream part into and out of alignment with the latter, the lever further including force threshold detecting means between said upstream and downstream parts for detecting an attempt by a driver of the vehicle to operate the lever, said detecting means comprising electrical sensor means and resilient return means for restoring said parts into alignment with each other in the absence of a force applied to the knob, said detecting means being adapted to produce electrical signals from the sensor means when a force greater than a predetermined force threshold is applied to the knob in one of two opposed reference directions, wherein the lever includes a female element which is fixed with respect to said downstream part, and said detecting means comprise a resiliently deformable elastic bar having a head portion which is fixed with respect to the knob and a foot portion engaged in said female element and joined to said head portion and wherein said sensor means include means defining electrical contact zones, said electrical zones being carried by a ferrule partly surrounding the elastic bar with a clearance and fixed to one of said upstream and downstream parts, said ferrule constituting a reaction member against applied forces, so as to limit the angular displacement of the upstream part of the lever with respect to its downstream part when the lever is operated.

2. A lever according to claim 1, wherein the detecting means further including a projecting contact element associated with the elastic bar for contact with the said contact zones.

3. A lever according to claim 2, wherein the projecting contact element is arranged in the vicinity of the head portion of the elastic bar.

4. A lever according to claim 3, wherein the knob has a hollow recess, the said projecting contact element being disposed in the said hollow recess.

5. A lever according to claim 2, wherein the said projecting contact element is arranged in the vicinity of the foot portion of the elastic bar.

6. A lever according to claim 2, wherein the projecting contact element is carried by the elastic bar, the latter further including a middle portion joining said contact element to one of said head and foot portions of the elastic bar, the middle portion of the latter being of smaller cross section than its said foot portion.

7. A lever according to claim 6, wherein the elastic bar further includes an intermediate junction portion joining the projecting contact element to the other of said head and foot portions, the intermediate portion having a greater cross section than its middle portion.

8. A lever according to claim 1, wherein said ferrule defines said female element.

9. A lever according to claim 8, wherein the ferrule is at least partly secured to one of said head and foot portions of the elastic bar whereby to constitute a subassembly.

10. A lever according to claim 9, wherein the head portion, the projecting contact element, and at least part of the foot portion of the elastic bar are of substantially the same cross section, whereby the elastic bar can be inserted into the ferrule.

11. A lever according to claim 10, wherein the head and foot portions of the elastic bar are provided with respective degassing passages.

12. A lever according to claim 8, wherein the ferrule is formed with two flats for manipulation of the ferrule.

13. A lever according to claim 8, further including means securing the ferrule to the knob.

14. A lever according to claim 8, further including a flexible electrical supply circuit of low thickness carried by the ferrule said contact zones forming parts of said flexible electrical supply circuit.

15. A lever according to claim 1, wherein the elastic bar, the ferrule and the projecting contact element are of a material which is electrically conducting.

* * * * *